Patented Feb. 18, 1930

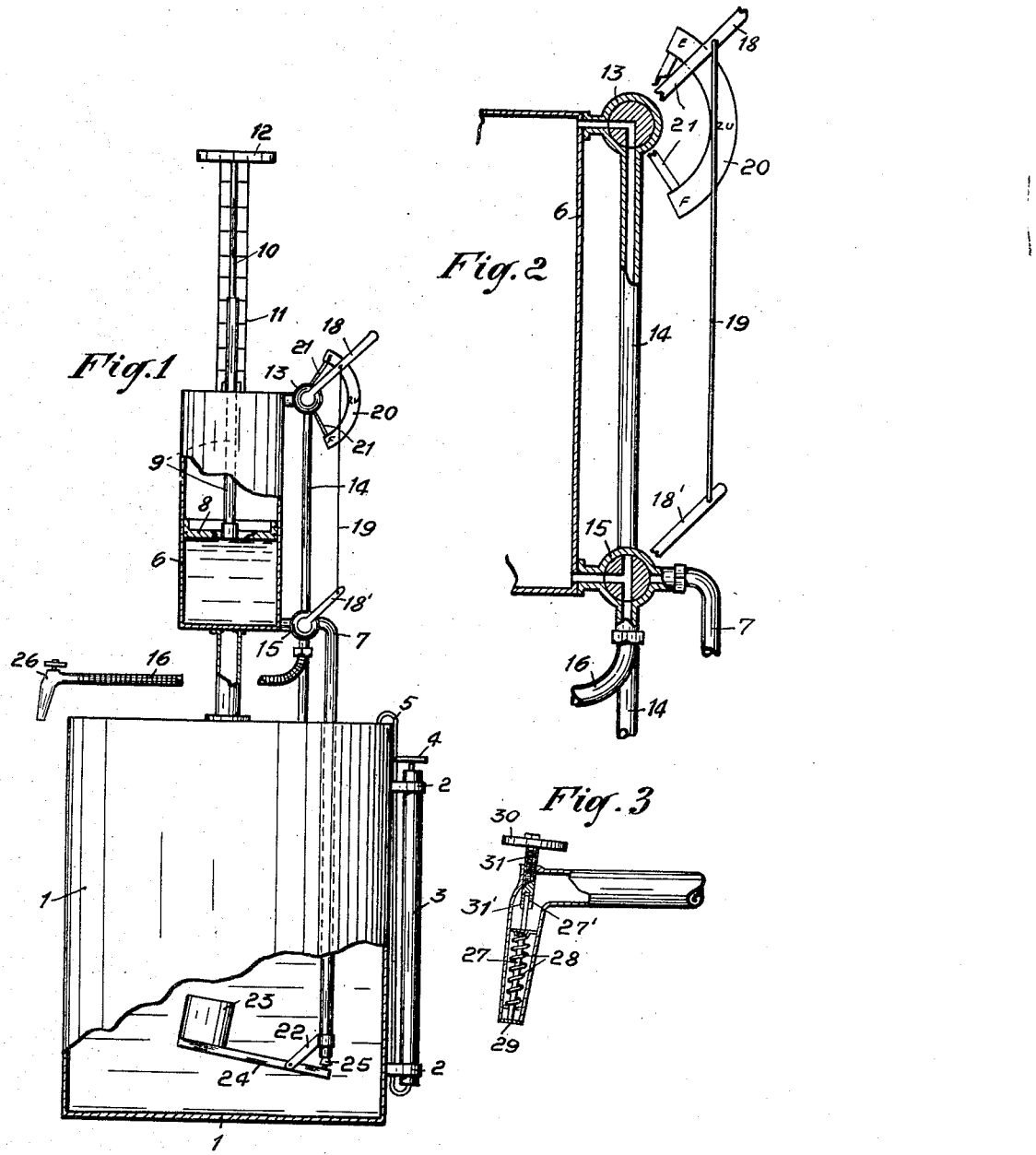

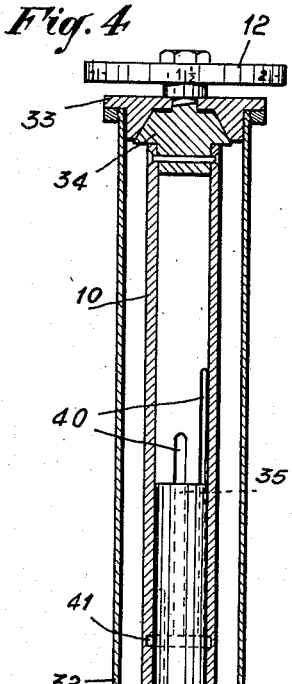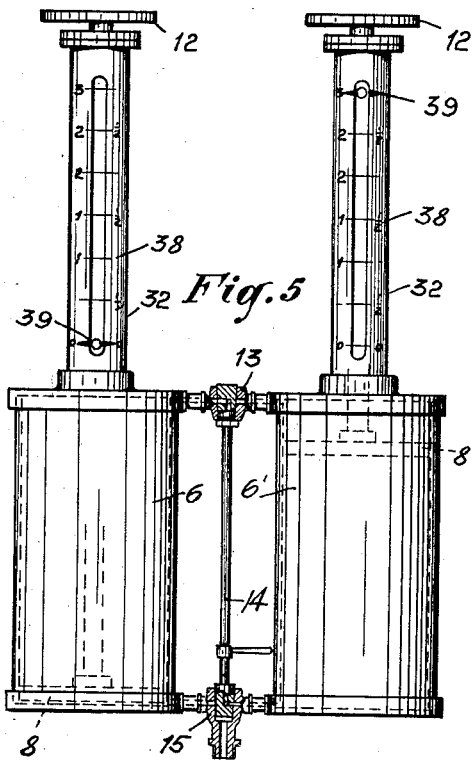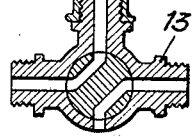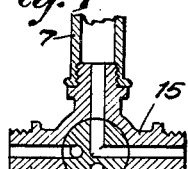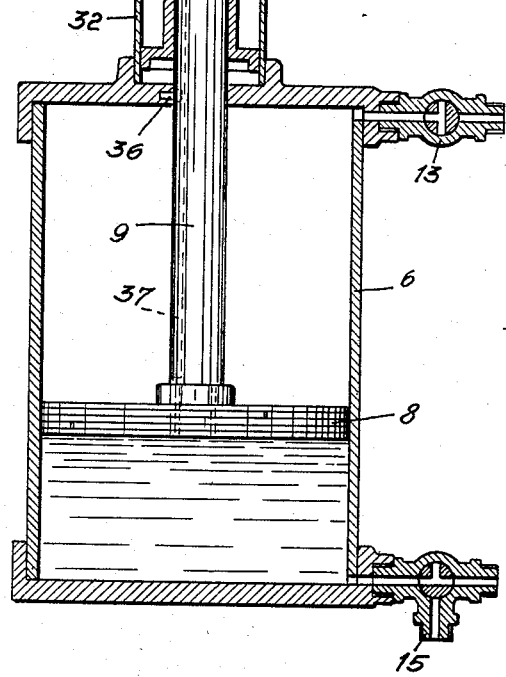

1,748,044

UNITED STATES PATENT OFFICE

PETER HUBER, OF ZURICH, SWITZERLAND

APPARATUS FOR DISPENSING LIQUIDS IN MEASURED QUANTITY

Application filed October 13, 1928, Serial No. 312,317, and in Germany October 4, 1927.

This invention relates to a method and tank installation, for tapping thin and viscous oils and fats in measured quantities from a reservoir, so that it is possible to refill within the shortest time change speed gears and Cardan joints and the like with thin and viscous oils and fats.

According to the improved method this is obtained by forcing the material to be tapped with the aid of compressed air from the tank into a measuring vessel from which the measured material is again forced by the same compressed air to the tapping point by letting the compressed air in the tank flow over the measured material in the measuring vessel.

For carrying out the method a special tank installation is required which is shown, by way of example, in the accompanying drawing, in which:—

Fig. 1 is an elevation partly in section.

Fig. 2 is a vertical section through the measuring vessel showing the cocks of the same.

Fig. 3 shows the tapping cock in elevation, partly in section.

Fig. 4 shows in longitudinal section another form of construction of the measuring vessel.

Fig. 5 shows in elevation two co-operating measuring vessels, and

Figs. 6 and 7 show the cocks for the two cooperating measuring vessels.

A tank 1 serves for storing oil or fat and has on one side a hand pump 3 held by means of arms 2. This hand pump 3 has a pump rod 4 with handle and communicates with the tank at the top of the same by means of a tube 5. When the pump is being operated air is pumped into the tank so that the oil or fat is forced through a pipe 7 into a measuring vessel 6. A piston 8, shiftable in the measuring vessel 6, has an upwardly directed tube 9 shiftably mounted on a rod 10. Tube 9 and guide rod 10 are arranged in a tubular casing 11 on which a scale is marked. The height of the guide rod 10 and thereby the length of the stroke of the piston is regulated by means of a disc 12 which may be rotatable and fitted with means like those shown in Fig. 4 or with analogous means.

At the side of the measuring vessel 6 at the upper end of the same a two way cock 13 is mounted to which a pipe 14 is connected which taps in the tank. At the same side of the measuring vessel at the lower end of the same a three-way cock 15 is arranged, connected with the tapping hose 16, with the measuring vessel 6 and with the supply pipe 7.

The supply pipe 7 ends a short distance above the bottom plate of tank 1, and on this lower end of pipe 7 an arm 22 is fixed to which a lever 24, carrying on its outer end a float 23, is oscillatably mounted. The inner end of lever 24 carries a valve 25 designed to prevent access of compressed air into the pipe 7, when the oil level in the tank has sunk to below pipe 7.

The tapping hose 16 is closed at its free end by a cock 26 to prevent dripping of oil. With this object in view a spring 28, wound around a bolt 27 in the cock, presses the valve 29 against its seat in the mouth of the cock. Bolt 27 engages with the screw spindle 31 by means of its wedge shaped end 27' engaging with a transverse groove 31' of said screw spindle. The movement of rod 27 and consequently that of valve 29 is thus limited so that according to the adjusting of the screw spindle the valve is lifted more or less off its seat, whereby the speed of flow of the oil is regulated.

The valve is pressed in outward direction automatically by the outflowing oil. As soon as the power of the spring 28 exceeds that of the oil pressure the valve is closed.

A handle 30 on the top end of the screw spindle 31 serves to adjust the position of rod 27 and of valve 29.

On the axles of the plugs of the two cocks 13, 15 a lever 18, 18' respectively is mounted said two levers being connected with one another by a rod 19. The lever 18 of the upper cock 13 forms a handle moving over a sector 20, fixed on the cock by means of stays 21.

The sector 20 has marks E, Zu, F to indicate the positions of the lever.

When the lever 18 is in the position E, the compressed air flows in through the pipe at the top end of the measuring vessel, whereby piston 8 is lowered so that it forces the oil from the measuring vessel into the hose 16. When the lever 18 is standing on Zu, i. e. turned one eighth of a revoltion, the cock plugs are rotated accordingly so that the two cocks 13, 15 are closed. By turning the lever 18 another eighth revolution into the position F, the upper cock 13 is closed, the lower cock 15 being rotated so that the pipe 7 is made to communicate with the bottom end of the measuring vessel and that oil is forced into the measuring vessel from the tank by the pressure of the compressed air. If not sufficient compressed air is in the tank, the hand pump has to be operated.

The invention enables an easy and secure tapping of oil, and the apparatus will be preferably mounted at the side of benzine columns on streets, in garages or at other convenient places.

In the form of construction shown in Fig. 4 the piston 8 has an upwardly directed piston rod 9, telescoped in a guide tube 10, the latter having in its outer surface several grooves 40 of different length merging at the lower end into an annular groove 41. The guide tube 10 is rotatably mounted in a sleeve 32 fixed on the measuring vessel 6 and closed at the top end by a lid 33. In this lid 33 the top end of the guide tube 10 is guided by means of a conical rotary body 34 which extends through the lid 33 and carries on its end a hand wheel 12 on which a scale in liters is marked. The guide tube 10 can be rotated by means of this hand wheel 12 so that a horizontal pin 35 of the piston rod 9 engages with the one or other of the longitudinal grooves 40, said pin 35 engaging with the annular groove 41 when the piston 8 is in the lowest position.

A pin 36 in the cover plate of the measuring vessel 6 engaging with the longitudinal groove 37 of the piston rod 9 prevents rotating of said piston rod.

The measuring quantity of oil depends on the length of the groove 40 with which the pin 35 engages so that, by rotating the guide sleeve 10 to make the pin 35 engage with another groove 40 this quantity can be altered.

If for instance 1½ liter oil have to be withdrawn from the tank the hand wheel 13 is rotated to the graduation line for 1½ liter on the scale. The corresponding groove 40 is thereby brought into register with the pin 35. The compressed air which is then pumped into the tank forces oil through cock 15 into the measuring vessel 6, whereby the piston 8 is lifted until its pin 35 strikes against the upper end of the corresponding groove 40 so that the piston is stopped and the quantity of oil under the same amounts to accurately 1½ liter. The plugs of the two cocks are then reversed so that the compressed air from the tank flows through cock 13 onto the piston 8, whereby this piston is made to descend, and forces the measured quantity of oil to the tapping point. Thanks to the piston 8 no oil can stick on the wall of the measuring vessel and accurately the measured quantity of oil is delivered. When three liters of oil are desired, the corresponding groove 40 is adjusted over the stud 35 by according rotation of the hand wheel 12 and guide tube 10, the piston being of course in its lowest position. On the piston rod 9 a pointer 39 can be fixed designed to move over a scale 38 on the outer surface of the casing 32.

As shown in Fig. 5 the tank installation comprises two cooperating measuring vessels 6 6' communicating by means of cocks 13, 15 which are positively operated. To the upper cock 13 the air pipe 14 from the tank is connected and to the cock 15 the oil pipe 7 of the tank is connected. The plugs of the cocks 13, 15 are adapted to be adjusted so that the measuring vessels are alternately supplied with oil or fat from the tank and emptied again. In accordance with the position of the cock plugs shown in Figs. 6 and 7 oil or fat is supplied to the measuring vessel 6, when compressed air is flowing into the tank, while at the same time compressed air is admitted through cock 13 into the measuring vessel 6' so that the measuring vessel is emptied. When one measuring vessel is being filled the other measuring vessel is being emptied and conversely. This combination of two measuring vessels makes it possible to withdraw greater quantities of oil or fat very rapidly from the tank in accurately measured quantity.

I claim:—

A tank installation from which thin and viscous oils or fats in measured quantities can be tapped, comprising in combination with a tank, a pressure pipe and two tapping pipes, a measuring vessel, a piston shiftably mounted in said measuring vessel to prevent oil sticking on the inner wall of said measuring vessel said piston being controlled at the tapping, on the one hand, by the measured oil and, on the other hand, by the compressed air, and a guide tube for altering the stroke of said piston, said guide tube having longitudinal grooves of different length, a horizontal pin on the rod of the piston, adapted to be brought in engagement with any of said grooves by rotation of said guide tube, a sleeve fixed on said measuring vessel enclosing said guide tube, a hand wheel with liter scale on the top end of said guide groove, and a regulating valve movably mounted on the lower end of said oil pipe communicating with the lower portion of said measuring vessel designed to prevent access of compressed air into said oil pipe when said tank is empty.

In testimony whereof I affix my signature.

PETER HUBER.